United States Patent [19]

Arai

[11] Patent Number: 4,859,414
[45] Date of Patent: Aug. 22, 1989

[54] ALLOY FOR DISK ROTOR

[75] Inventor: Masao Arai, Kumagaya, Japan

[73] Assignees: Akebono Brake Industry Co., Ltd., Tokyo; Akebono Research and Development Centre Ltd., Hanyu, both of Japan

[21] Appl. No.: 183,222

[22] Filed: Apr. 19, 1988

[30] Foreign Application Priority Data

May 11, 1987 [JP] Japan .................. 62-112414

[51] Int. Cl.[4] ........................... C22C 38/36
[52] U.S. Cl. ........................ 420/15; 420/13
[58] Field of Search ............ 148/321; 420/15, 13, 420/9; 188/251 R, 251 A, 251 M

[56] References Cited

FOREIGN PATENT DOCUMENTS 52-61117  5/1977  Japan .................. 420/15
432223  12/1977  U.S.S.R. ............... 420/15

Primary Examiner—Deborah Yee
Attorney, Agent, or Firm—Oblon, Spivak, McClelland, Maier & Neustadt

[57] ABSTRACT

An alloy for disk rotor utilized in disk brake is disclosed, which contains 2.3 to 3.0 wt. % of silicon, 1.0 to 3.0 wt. % of manganese, 0.2 to 1.0 wt. % chromium, 0 to 2.0 wt. % of copper and 3.7 to 4.2 wt. % of carbon, the remainders being inevitable impurities and iron.

6 Claims, 3 Drawing Sheets

ALLOY FOR DISK ROTOR

BACKGROUND OF THE INVENTION

The present invention relates to an alloy for disk rotor utilized in disk brake, in particular, the alloy for disk rotor which is utilized in the disk brake for the braking of cars and which has an ability to dampen the vibrations and a high strength.

For the braking of cars, the disk brake is used widely. The disk brake is constructed so that the braking force can be exerted by pressing a pair of friction pads provided in a state that they are opposite to the both sides of disk rotor rotatable together with the wheels against said both sides of disk rotor by means of hydraulic piston.

Now, with such disk rotor utilized in the disk brake, the small vibrations are inevitable at the time of braking due to the friction engagement with friction pads and, when these vibrations become large, it comes to generate the noise offensive to the ear.

For this reason, as the metal which constitutes the disk rotor, an alloy high in the damping factor of vibrations has been used hitherto and the vibrations generating upon braking due to the friction engagement with friction pads have been made not to grow so large as generating the noise offensive to the ear.

As such alloy high in the damping factor of vibrations for constituting the disk rotor, one containing 2.5 to 2.8 wt.% of silicon, 0.5 to 0.9 wt.% of manganese, 0 to 0.3 wt.% of chromium, 0 to 0.3 wt.% of copper and 3.4 to 4.0 wt.% of carbon, the remainders being inevitable impurities and iron, has been used widely hitherto.

However, the conventional alloy for disk rotor having the composition as mentioned above has low tensile strength in place of the high damping factor of vibrations, thus it was not necessarily possible to obtain sufficient strength when utilized in the disk brake used under severe conditions.

The alloy for disk rotor of the invention aims at that, by retaining the high damping factor of vibrations while improving the tensile strength, the inconvenience aforementioned is dissolved.

SUMMARY OF THE INVENTION

The alloy for disk rotor of the invention contains 2.3 to 3.0 wt.% of silicon, 1.0 to 3.0 wt.% of manganese, 0.2 to 1.0 wt.% of chromium, 0 to 2.0 wt.% of copper and 3.7 to 4.2 wt.% of carbon, and the remainders are inevitable impurities and iron.

DETAILED DESCRIPTION OF THE INVENTION

The alloy for disk rotor of the invention having the composition aforementioned is formed into the disk-like disk rotor and utilized in the disk brake. In this case, since the alloy itself has high damping factor of vibrations and high tensile strength, said disk rotor comes not to vibrate so seriously as generating the noise offensive to the ear even when it vibrates upon braking accompanying with the friction with friction pads and yet to retain sufficient strength.

In following, the examples of the invention will be described.

EXAMPLE 1

The alloy for disk rotor of the invention was formulated to contain 2.72 wt.% of silicon, 2.5 wt.% of manganese, 0.5 wt.% of chromium and 3.78 wt.% of carbon, the remainders being inevitable impurities and iron.

When measuring the logarithmic damping factor of this alloy, it showed to be $47 \times 10^{-3}$. Moreover, the tensile strength was 18 kgf/mm$^2$.

Besides, on the basis of this example 1, the effects of the formulation rate of respective ingredients (Si, Mn, Cr, C) on the logarithmic damping factor and the tensile strength were determined, the results of which are shown in FIG. 1 through FIG. 4.

Figure 1:
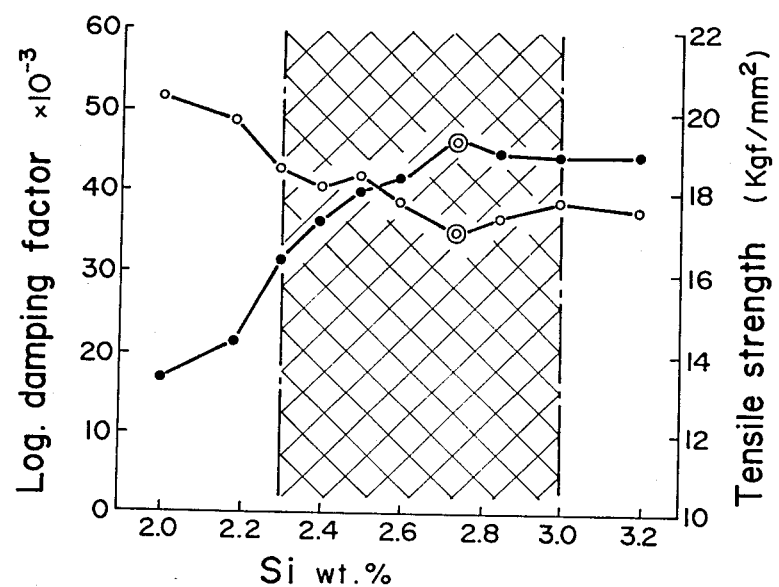
FIG. 1 through FIG. 4 are charts showing the effects of the formulation rates of respective ingredients on the logarithmic damping factor and the tensile strength.
Figure 2:
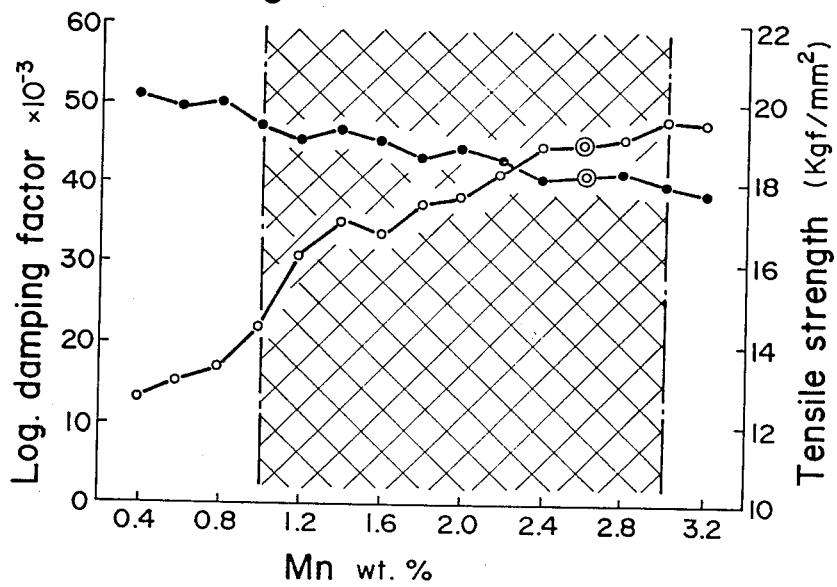
Figure 3:
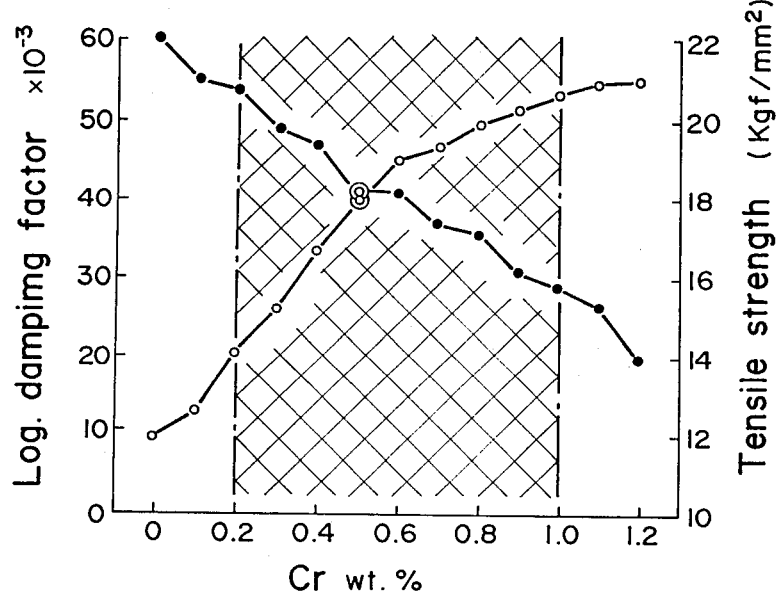
Figure 4:
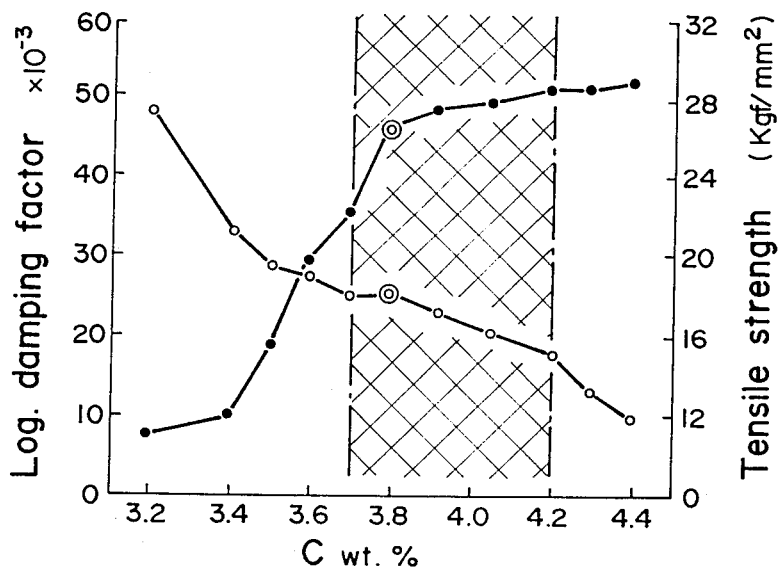

Thereamong, FIG. 1 shows the variations of logarithmic damping factor and tensile strength when varying the formulation rate of silicon alone, FIG. 2 the variations when varying similarly the formulation rate of manganese, FIG. 3 the variations when varying similarly the formulation of chromium and FIG. 4 the variations when varying the formulation rate of carbon, respectively.

In these FIG. 1 through FIG. 4, a circle (○) shows the tensile strength, a black circle (●) the logarithmic damping factor and a double circle (◎) the measurement values of these in said example 1, respectively. Moreover, the area of oblique grating in the respective charts is a range of the invention described in the scope of the claim.

Figure 5:
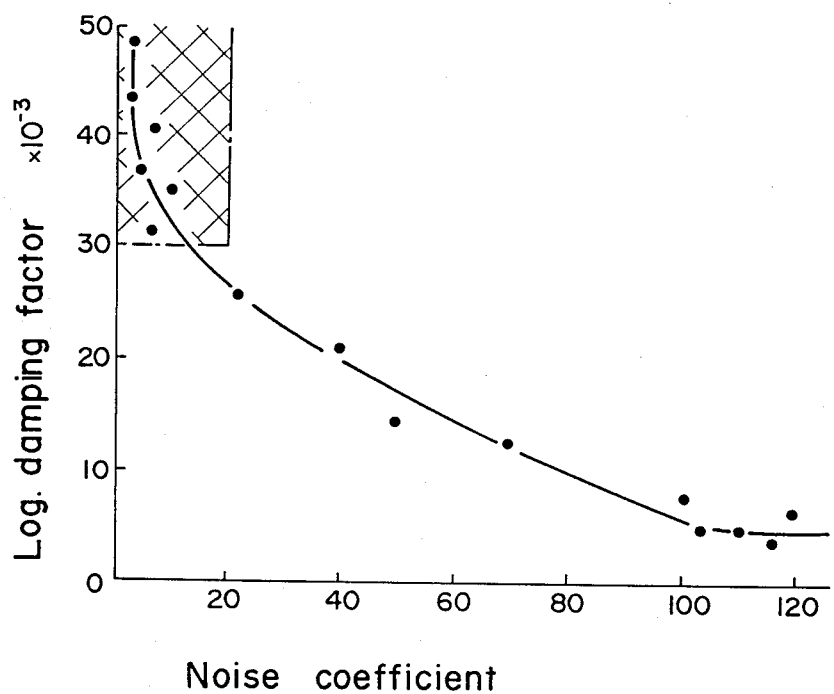
FIG. 5 is a chart showing the relationship between the logarithmic damping factor and the noise coefficient.

Besides, as evident from said areas of oblique grating, the logarithmic damping factor is established within a range of not less than $30 \times 10^{-3}$ in the invention. The establishement of this range is based on a following reason. That is, according to the experiments by the inventor, the relationship between the logarithmic damping factor and the noise coefficient (product of the frequency with which noise generates and the strength of noise) is as shown in FIG. 5. But, when the noise coefficient is not more than 20, such noise that comes into question practically does hardly generate. For this reason, the range of the logarithmic damping factor being not less than $30 \times 10^{-3}$, where the noise coefficient becomes not more than 20, was made to be that of the invention.

EXAMPLE 2

The alloy for disk rotor of the invention was formulated to contain 2.74 wt.% of silicon, 2.2 wt.% of manganese, 0.6 wt.% of chromium and 3.87 wt.% of carbon, the remainders being inevitable impurities and iron.

When measuring the logarithmic damping factor of this alloy, it showed to be $47 \times 10^{-3}$. Moreover, the tensile strength was 17 kgf/mm$^2$.

EXAMPLE 3

The alloy for disk rotor of the invention was formulated to contain 2.65 wt.% of silicon, 2.6 wt.% of manganese, 0.6 wt.% of chromium and 3.90 wt.% of carbon, the remainders being inevitable impurities and iron.

When measuring the logarithmic damping factor of this alloy, it showed to be $41 \times 10^{-3}$. Moreover, the tensile strength was 19 kgf/mm$^2$.

EXAMPLE 4

The alloy for disk rotor of the invention was formulated to contain 2.85 wt.% of silicon, 1.2 wt.% of manganese, 0.5 wt.% of chromium, 1.5 wt.% of copper and 3.85 wt.% of carbon, the remainders being inevitable impurities and iron.

When measuring the logarithmic damping factor of this alloy, it showed to be $41 \times 10^{-3}$. Moreover, the tensile strength was 18 kgf/mm$^2$.

EXAMPLE 5

The alloy for disk rotor of the invention was formulated to contain 2.75 wt.% of silicon, 1.0 wt.% of manganese, 0.6 wt.% of chromium, 1.8 wt.% of copper and 4.16 wt.% of carbon, the remainders being inevitable impurities and iron.

When measuring the logarithmic damping factor of this alloy, it showed to be $31 \times 10^{-3}$. Moreover, the tensile strength was 20 kgf/mm$^2$.

Comparison of the results as above with the measurement values of general disk rotor (particularly such one that does not take the damping of vibrations into consideration) used conventionally and those of conventional vibration-damping disk rotor having the composition aforementioned is shown in the following attached table.

Attached table

| | Si wt. % | Mn wt. % | Cr wt. % | Cu wt. % | C wt. % | Logarithmic damping factor $\times 10^{-3}$ | Tensile strength kgf/mm$^2$ |
|---|---|---|---|---|---|---|---|
| Conventional article | | | | | | | |
| General rotor | 1.9–2.5 | 0.6–0.9 | 0–0.2 | 0–0.4 | 3.0–3.4 | 5–10 | 20–30 |
| Damping rotor | 2.5–2.8 | 0.5–0.9 | 0–0.3 | 0–0.3 | 3.4–4.0 | 20–35 | 12–14 |
| Article of the invention | | | | | | | |
| Example 1 | 2.72 | 2.5 | 0.5 | 0 | 3.78 | 47 | 18 |
| Example 2 | 2.74 | 2.2 | 0.6 | 0 | 3.87 | 47 | 17 |
| Example 3 | 2.65 | 2.6 | 0.6 | 0 | 3.90 | 41 | 19 |
| Example 4 | 2.85 | 1.2 | 0.5 | 1.5 | 3.85 | 41 | 18 |
| Example 5 | 2.75 | 1.0 | 0.6 | 1.8 | 4.16 | 31 | 20 |

As evident from this attached table and also from FIG. 1 through FIG. 4 aforementioned, the alloys for disk rotor of the invention have the damping factor of vibrations equal to or higher than that of conventional vibration-damping disk rotor and yet have higher tensile strength than that of conventional vibration-damping rotor.

Besides, in the invention, there appear the harmful effects that the hardness becomes high resulting in the brittleness and the processing becomes difficult, if raising the amount of manganese over 3.0 wt.%.

Since the alloys for disk rotor of the invention are constituted as mentioned above, they are very effective in industrial as the alloys having sufficient effect on the prevention of noise and yet having high strength.

What is claimed is:

1. An alloy for a disk rotor utilized in a disk brake, which consists essentially of 2.3 to 3.0 wt.% of silicon, 2.2 to 3.0 wt.% of manganese, 0.2 to 1.0 wt.% of chromium, 3.7 to 4.2 wt.% of carbon, and up to 2.0 wt.% of copper with the remainder being iron and inevitable impurities.

2. The alloy of claim 1, which consists essentially of 2.65 to 2.72 wt.% of silicon, 2.2 to 2.5 wt.% of manganese, 0.5 to 0.6 wt.% of chromium, 3.78 to 4.16 wt.% of carbon, and up to 1.8 wt.% of copper with the remainder being iron and inevitable impurities.

3. An alloy for a disk rotor utilized in a disk brake, which consists essentially of 2.65 to 2.74 wt.% of silicon, 2.2 to 2.6 wt.% of manganese, 0.5 to 0.6 wt.% of chromium and 3.78 to 3.90 wt.% of carbon, with the remainder being iron and inevitable impurities.

4. The alloy of claim 3, which consists essentially of 2.72 wt.% of silicon, 2.5 wt.% of manganese, 0.5 wt.% of chromium and 3.78 wt.% of carbon, with the remainder being iron and inevitable impurities.

5. The alloy of claim 3, which consists essentially of 2.74 wt.% of silicon, 2.2 wt.% of manganese, 0.6 wt.% of chromium and 3.8 wt.% of carbon, with the remainder being iron and inevitable impurities.

6. The alloy of claim 3, which consists essentially of 2.65 wt.% of silicon, 2.6 wt.% of manganese, 0.6 wt.% of chromium and 3.90 wt.% of carbon, with the remainder being iron and inevitable impurities.

* * * * *